(12) United States Patent
Soyak et al.

(10) Patent No.: US 9,119,079 B2
(45) Date of Patent: Aug. 25, 2015

(54) SYSTEM AND METHOD TO AVOID INTERFERENCE WITH RADAR SYSTEMS

(75) Inventors: Eren Soyak, Istanbul (TR); Firat Birlik, Istanbul (TR); Metin Ismail Taskin, Istanbul (TR)

(73) Assignee: Airties Kablosuz Iletisim San. Ve Dis Tic. A.S., Istanbul (TR)

( * ) Notice: Subject to any disclaimer, the term of this patent is extended or adjusted under 35 U.S.C. 154(b) by 140 days.

(21) Appl. No.: 13/558,170

(22) Filed: Jul. 25, 2012

(65) Prior Publication Data

US 2013/0194944 A1 Aug. 1, 2013

Related U.S. Application Data

(60) Provisional application No. 61/591,697, filed on Jan. 27, 2012.

(51) Int. Cl.
| | | |
|---|---|---|
| *H04W 16/14* | (2009.01) | |
| *H04W 72/08* | (2009.01) | |
| *H04W 84/12* | (2009.01) | |
| *H04L 12/413* | (2006.01) | |

(52) U.S. Cl.
CPC .............. *H04W 16/14* (2013.01); *H04L 12/413* (2013.01); *H04W 72/08* (2013.01); *H04W 84/12* (2013.01)

(58) Field of Classification Search
CPC combination set(s) only.
See application file for complete search history.

(56) References Cited

U.S. PATENT DOCUMENTS

| | | |
|---|---|---|
| 6,870,815 B2 | 3/2005 | McFarland et al. |
| 7,715,801 B2 | 5/2010 | Tsuruno |
| 7,839,890 B1 * | 11/2010 | Neitzel et al. ................. 370/468 |
| 2004/0151137 A1 * | 8/2004 | McFarland et al. ........... 370/329 |
| 2006/0209972 A1 | 9/2006 | Lemberger et al. |
| 2007/0143391 A1 | 6/2007 | Nakamura |
| 2007/0264935 A1 * | 11/2007 | Mohebbi ...................... 455/41.2 |
| 2009/0116411 A1 * | 5/2009 | Castagnoli et al. ........... 370/256 |
| 2009/0146866 A1 * | 6/2009 | Matsumoto et al. ............ 342/52 |
| 2010/0225530 A1 | 9/2010 | Lin et al. |

(Continued)

FOREIGN PATENT DOCUMENTS

| | | |
|---|---|---|
| EP | 1443661 B1 | 4/2004 |
| WO | WO-2011015905 A1 | 2/2011 |
| WO | 2011056670 | 5/2011 |

OTHER PUBLICATIONS

International Search Report in GB1213670.1 dated Aug. 30, 2012 (3 page).

(Continued)

*Primary Examiner* — Alpus H Hsu
*Assistant Examiner* — Yee Lam
(74) *Attorney, Agent, or Firm* — Harness, Dickey & Pierce (57) ABSTRACT

A gateway device includes an input port for receiving Internet signals, a single RF module, a memory and a processor. The memory has computer executable instructions stored therein, wherein execution of the computer executable instructions by the processor causes the processor to retrieve a channel monitoring time from the memory. The execution of the computer executable instructions further causes the processor to monitor selected channels and develop and store in the memory a value of a confidence level for each channel. Each channel is monitored for a predetermined period of time between transmissions of data and the confidence level associated with a channel indicates the probability that frequencies associated with such channel are used by a radar system.

14 Claims, 8 Drawing Sheets

(56) References Cited

U.S. PATENT DOCUMENTS

| | | | |
|---|---|---|---|
| 2010/0278117 A1* | 11/2010 | Sharma et al. | 370/329 |
| 2010/0302966 A1 | 12/2010 | Matsuura | |
| 2010/0303024 A1* | 12/2010 | Gossain | 370/329 |
| 2010/0311342 A1* | 12/2010 | Arbel | 455/62 |
| 2011/0096739 A1 | 4/2011 | Heidari et al. | |
| 2011/0150053 A1 | 6/2011 | Kim | |
| 2012/0026899 A1* | 2/2012 | Lee et al. | 370/252 |
| 2012/0213158 A1 | 8/2012 | Birlik et al. | |
| 2013/0242862 A1 | 9/2013 | Birlik | |

OTHER PUBLICATIONS

Communication and Search Report for corresponding European patent application No. 11164227.8 dated Jul. 3, 2013.
Decision to Grant a European Patent for corresponding European patent application No. 11164227.8 dated Feb. 6, 2014.
Kari Kostiainen et al., "Usable Access Control Inside Home Networks," World of Wireless, Mobile and Multimedia Networks, 2007. WOWMOM 2007. IEEE International Symposium On A, IEEE, PI, Jun. 1, 2007, pp. 1-6, XP031149243, ISBN: 978-1-4244-0992-1.
Cynthia Kuo et al., "Low-Cost Manufacturing, Usability, and Security: An Analysis of Bluetooth Simple Pairing and Wi-Fi Protected Setup," Feb. 12, 2007, Financial Cryptography and Data Security; [Lecture Notes in Computer Science], Springer Berlin Heidelberg, Berlin, Heidelberg, pp. 325-340, XP019137008, ISBN: 978-3-540-77365-8.
Grochla K et al., "Autoconfiguration procedures for multiradio wireless mesh networks based on DHCP protocol," World of Wireless, Mobile and Multimedia Networks & Workshops, 2009. WOWMOM 2009. IEEE International Symposium on a, IEEE, Piscataway, NJ, USA, Jun. 15, 2009, pp. 1-6, XP031543604, ISBN: 978-1-4244-4440-3.
ETSI EN 301 893 V1.5.1 Harmonized European Standard (Telecommunications series), "Broadban Radio Access Networks (BRAN); 5 GHz high performance RLAN; Harmonized En covering the essential requirements of article 3.2 of the R&TTE Directive", pp. 1-67, Dec. 2008.

\* cited by examiner

| Channel | 0 | 1 | 2 | 3 | 4 |
|---|---|---|---|---|---|
| CCA | 0.70 | 0.69 | 0.55 | 0.68 | 0.29 |
| Pd | NA | NA | NA | NA | NA |
| CAC | NA | NA | NA | NA | NA |
| CL | NA | NA | NA | NA | NA |
| Available | 1 | 1 | 1 | 1 | 1 |

502, 504, 506, 508, 510, 512

| Channel | 5 | 6 | 7 | 8 | 9 |
|---|---|---|---|---|---|
| CCA | 0.45 | 0.66 | 0.87 | 0.99 | 0.12 |
| Pd | 0.60 | 0.60 | 0.60 | 0.60 | 0.60 |
| CAC | 1 | 0 | 1 | 1 | 1 |
| CL | 0.55 | 0.65 | 0.70 | 0.85 | 0.80 |
| Available | 0 | 0 | 1 | 1 | 1 |

| Channel | 10 | 11 | 12 | 13 | 14 | 15 | 16 | 17 | 18 | 19 | 20 | 21 |
|---|---|---|---|---|---|---|---|---|---|---|---|---|
| CCA | 0.23 | 0.44 | 0.54 | 0.77 | 0.67 | 0.85 | 0.65 | 0.66 | 0.43 | 0.52 | 0.30 | 0.60 |
| Pd | 0.60 | 0.60 | 0.60 | 0.60 | 0.60 | 0.60 | 0.60 | 0.99 | 0.99 | 0.99 | 0.60 | 0.60 |
| CAC | 1 | 0 | 1 | 1 | 1 | 1 | 0 | 1 | 1 | 1 | 1 | 1 |
| CL | 0.80 | 0.75 | 0.80 | 0.65 | 0.40 | 0.90 | 0.60 | 0.85 | 0.70 | 0.65 | 0.70 | 0.95 |
| Available | 1 | 0 | 1 | 1 | 0 | 0 | 1 | 0 | 0 | 0 | 1 | 1 |

SYSTEM AND METHOD TO AVOID INTERFERENCE WITH RADAR SYSTEMS

CROSS-REFERENCE TO RELATED APPLICATIONS

The present application claims benefit of provisional U.S. Patent Application 61/591,697, filed Jan. 27, 2012. The entire contents of such application are hereby incorporated by reference.

BACKGROUND OF THE INVENTION

1. Field of the Invention

The present invention is related to systems and methods of operating a wireless network, in particular to a system and method select channels for communication that do not interfere with radar systems.

2. Description of the Background of the Invention

In a wireless network, for example, a wireless local area network (WLAN or WiFi LAN), the capacity of a particular channel is affected by signal strength, as measured by the Received Signal Strength Indication (RSSI) of the channel. Wireless communication devices operating in a wireless network may monitor the RSSI of a channel being used thereby for communication and if the RSSI of the channel drops below an acceptable level, such devices switch to another channel that offers a higher RSSI. The process of channel selection in this manner is called Automatic Channel Selection (ACS).

Wireless networks connect nodes via channels corresponding to certain frequency ranges. Standards using CSMA/CA technologies, such as IEEE 802.11n, define channels such that two neighboring networks may operate using two channels that correspond to frequency ranges that are adjacent (or close) to one another. However, in such cases the error rate of the transmission in each channel increases thereby reducing the channel capacity of such channels. It is therefore advantageous to be able to select channels (frequency ranges) with the least interference from neighboring networks as measured by a channel scan or a Clear Channel Assessment (CCA), which measures the ratio of time for which the channel is not in detectable use.

Typical ACS-capable devices undertake ACS at boot time, where the "best" channel is selected once before regular operation begins, and is not changed until the device is rebooted or the user deliberately triggers ACS. Some devices undertake ACS by randomly changing channels when the channel capacity of the channel being used thereby is detected to drop below a predetermined threshold. Such devices "wander" from channel to channel until a channel that has sufficient capacity is identified. Devices that undertake ACS in this manner may be appropriate for applications in which real-time transmission of data is not critical. However, such devices may not sufficiently support applications in which real-time transmission of data is expected. For example, a wireless transmitter and receiver that undertake ACS in the manner described above would not be effective for transmitting streamed video data from the transmitter to the receiver. If during transmission, the channel capacity used by such transmitter and receiver were to drop, the streamed data may be interrupted while the transmitter and receiver hunt for another channel that has higher capacity. Such an interruption may cause presentation of the video to a user to stall unexpectedly and result in a poor experience for the user. Some devices avoid interrupting transmission during ACS by having two radio frequency units in each device. In such devices, the two RF units operate simultaneously wherein one RF unit monitors the capacity of the channel being used to transmit data and the other RF unit monitors the capacity of the other channels.

Some wireless communication devices that operate in a wireless network that uses a 2.4 GHz frequency band estimate the capacity of a channel using scanning or CCA and perform ACS in accordance with such estimates.

However, wireless communication devices that operate in a wireless network that uses a 5 GHz frequency band may experience interference from or interfere with radar systems operating nearby in the same or similar frequency band. In some jurisdictions, devices that communicate using channels associated with certain frequency ranges may be legally required to detect radar systems that also operate in such frequency ranges and avoid using such channel if a radar system is detected. For example, the "ETSI EN 301 893 V1.5.1 (December 2008) Harmonized European Standard" for 5 GHz wireless networks specifies that devices that operate using frequencies in the ranges of 5.250 GHz-5.350 GHz and 5.470-5.725 GHz frequency ranges must detect and avoid radar interference. A wireless device may detect the presence of a radar system operating in particular frequency range by performing a channel availability-check (CAC), whereby the device switches to a channel associated with a particular frequency range and listens fix radar operation for a predetermined duration before transmitting any data. Typically, upon switching to a new channel, the wireless device may listen for radar operation for between 1 and 10 minutes before transmission. Alternately, the device may detect radar systems by performing an off-channel CAC, whereby the device listens for radar operation in a given frequency range without actually switching channels (i.e., while possibly transmitting over another channel). Once a channel has been selected, the wireless device continues to monitor the channel to detect newly activated radar systems with a certain probability.

Heidari et al., U.S. Patent Application Publication No. 2011/0096739, discloses a system that uses downtime (i.e., Off-Channel CAC) or multiple antennas to scan alternative channels and order the scanned channels in order of quality. The entire contents of Heidari et al. are incorporated herein by reference.

Kim, U.S. Patent Application Publication No. 2011/0150053, and Tsuruno, U.S. Pat. No. 7,715,801 are directed to low-level radar signal detection algorithms and the operation of a CAC module and, in particular, how a CAC may undertaken. The entire contents of Kim and Tsuruno are incorporated herein by reference.

Lin et al., U.S. Patent Application Publication No. 2010/0225530 discloses a method of interference-free radar detection in which a device send a clear-to-send signal to itself to reserve a period of time during which the device may perform radar detection. The entire contents of Lin et al. are incorporated herein by reference.

Matsuura, U.S. Patent Application No. 2010/0302966 discloses using one system for transmitting over a channel and another system for simultaneously monitoring the channel being used for transmission or different channel. The entire contents of Matsuura are incorporated herein by reference.

McFarland et al, U.S. Pat. No. 6,870,815 B2 (McFarland et al) discloses a scanning process for CAC that operates in the background. The scanning process uses beacons to clear traffic in the network for a period of time, increasing time between packets in the network, and reducing the network load. The entire contents of McFarland et al. are incorporated herein by reference.

Kurt et al., International Patent Application Serial No. PCT/IB2009/053746 is directed to developing channel selection data in a wireless network. The entire contents of Kurt et al. are incorporated herein by reference.

Birlik, et al., U.S. Provisional Patent Application 61/624,834 is directed to a system and method to equalize transmission delays in communication networks. The entire contents of Birlik et al. are incorporated herein by reference.

Birlik, U.S. patent application Ser. No. 13/460,139 is directed to a wireless network setup and configuration distribution system. The entire contents of this application are also incorporated herein by reference.

SUMMARY OF THE INVENTION

According to one aspect of the present disclosure, a wireless network device comprises an input port for receiving Internet signals, a single RF module, a memory and a processor. The memory has computer executable instructions stored therein, wherein execution of the computer executable instructions by the processor causes the processor to retrieve a channel monitoring time from the memory. The execution of the computer executable instructions further causes the processor to determine if the single RF module is idle and determine a period of time the single RF module is idle. In addition, such execution causes the processor to also determine a quantity of 5 GHz channels that may be monitored in the period of time and randomly select channels to monitor. The quantity of selected channels does not exceed the quantity of 5 GHz channels that may be monitored. The execution of the computer executable instructions further causes the processor to monitor the selected channels and develop and store in the memory a value of a confidence level for each channel. Each channel is monitored for a predetermined period of time between transmissions of data and the confidence level associated with a channel indicates the probability that frequencies associated with such channel are used by a radar system.

According to further aspects of present disclosure, the wireless network device may be an access point. The wireless network device may be a gateway. The wireless network device operates in a wireless network. The wireless network includes a further wireless network device operating therein. The processor of the wireless network device and a processor of the further wireless network device simultaneously monitor an identical channel. The processor of the wireless network device and a processor of the further wireless network device simultaneously monitor a first and a second channel, wherein the first and the second channel are different. The processor of the further wireless network device monitors a channel and transmits a result of the monitoring to the wireless network device. The wireless network device is adapted to operate in an IEEE 802.11 compliant network.

DETAILED DESCRIPTION OF THE PREFERRED EMBODIMENTS

Figure 1:
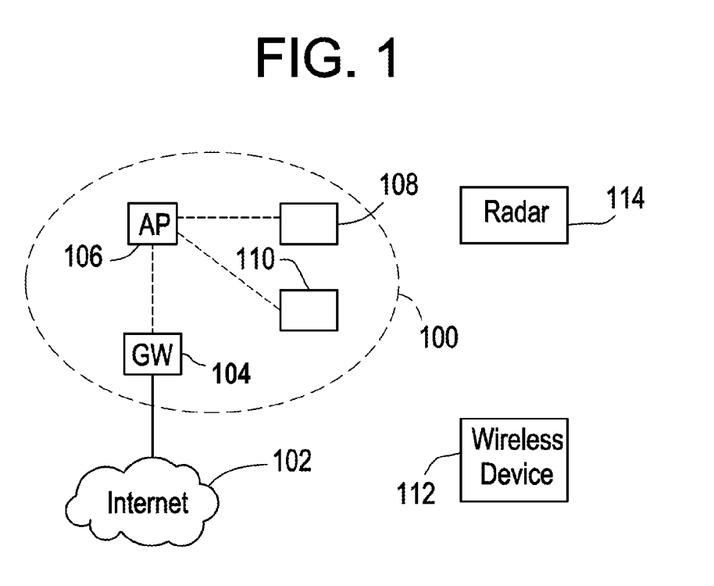
FIG. 1 is a block diagram of a network.

FIG. 1 is a block diagram of a network 100. The network 100 may be connected to the Internet 102 via a gateway 104. The gateway 104 may include an input port that provides connection to the Internet. The input port may be a wired connection or be connected to a modem or a broadband device that provides a connection to the Internet 102 or some other external network such as a Local Area Network (LAN) or Wide Area Network (WAN). The gateway 104 may communicate using a wire or a wireless connection with an access point 106 using an RF module thereof. The wireless access point 106 uses an RF module thereof to communicate with the gateway 104. The wireless access point 106 allows one or more devices 108 and 110 connected thereto to communicate with one another and with other devices operating in the Internet 102. The gateway 104 may also provide a wired interface to a computer (not shown) that allows such computer access to other computers operating in the Internet 102 or other external network. Typically, the gateway 104 also provides firewall, routing, switching, and/or domain name resolution functions. FIG. 1 also shows a neighboring wireless device 112 and a radar system 114 operating in proximity to the network 100. The neighboring wireless device 112 is not part of the network 100. That is the neighboring wireless device 112 does not directly transmit data to or receive data from the access point 106 or another device 108 or 110 inside the network 100 without such data passing through the gateway 104. It should be apparent that the network 100 may include additional access points that communicate with the access point 106. In some embodiments, the network 100 is a mesh network and the wireless access points 106 and/or the gateway 104 are nodes of such mesh network.

One of the nodes of the network 100 such as the gateway 104 or one of the access points operating in the network 100, for example, access point 106, is designated a master node. In some embodiments of the invention, the master node can be selected randomly, for example, each node that is a candidate to become a master node calculates a random number and such candidate node that has the highest random number is selected the master node. In other embodiments, the candidate node that is associated with a largest MAC address is selected the master node. In still other embodiments, each node in the network votes for a neighboring candidate node in the network and the candidate node that receives the most votes is selected the master node. In yet another embodiment, a predetermined node, for example, the gateway, is selected the master node. Other ways of selecting the master node will be apparent to those in the network. The master node selects a channel that is to be used for transmission. The master node may also evaluate the quality of other channels and determine when transmission should switch from one channel to another channel. For purposes of discussion, the access point 106 is designated as the master node hereinbelow.

To reduce interference from the neighboring wireless device 112, the access point 106, acting as the master node, selects a channel for communication that has a minimum overlap with the channel selected by the neighboring wireless device 112. That is, the overlap between range of frequencies associated with the channel used to communicate wireless in the network 100 and the range of frequencies associated with the channel used by the neighboring wireless device 112 is minimized.

Further, the access point 106 may switch communication from a first channel to a second channel if such access point 106 determines that the channel capacity of the second channel is greater than the channel capacity of the first channel. However, before the access point 106 can switch communications from the first channel to the second channel, the access point 106 must determine that the probability of the radar system 114 not using any of the frequencies associated with the second channel is at least a predetermined value $P_d$. The value $P_d$ may vary in accordance with the channel to which transmission is switched and may be specified by the regulations and/or standards specifying network devices.

Figure 2:
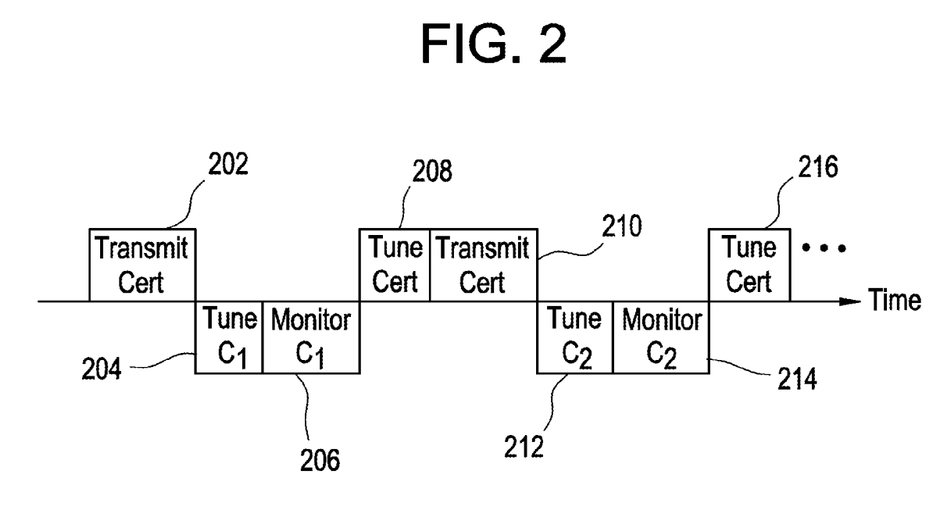
FIG. 2. is a timing diagram associated with a device operating in the network of FIG. 1.

FIG. 2 shows a timeline of the steps undertaken by the master node of the network 100 that is using a channel $C_{CRT}$ for communication to determine the channel capacity of other channels and to determine if a radar system is using frequencies associated with such other channels. In particular, the master node transmits data on the channel $C_{CRT}$ during a period of time 202. Thereafter, the master node uses a period of time 204 to tune a candidate channel $C_1$ and monitors (sniffs) the channel $C_1$ for a period of time 206 to assess the quality thereof. After monitoring the channel $C_1$, the master node tunes the channel $C_{CRT}$, which takes a period of time 208, and transmits data using the channel $C_{CRT}$ for a period of time 210. Thereafter, the master node, tunes another candidate channel $C_2$ for a period of time 212 and monitors the channel $C_2$ for a period of time 214 to assess the quality of such channel. The master node again times the channel $C_{CRT}$ for a period of time 216 so that such channel may be used for further transmission. Although the master node coordinates when transmission is to occur over the channel $C_{CRT}$ and when the candidate channels $C_1$ and $C_2$ are to be monitored, any devices in the network 100 that are capable may assess the quality of the candidate channel $C_1$ and $C_2$. To assess the quality of the channel $C_1$ or $C_2$, a device 104, 106, 108, and/or 110 in the network 100 develops measurements of channel availability check (CAC) and clear channel assessment (CCA). For each channel $C_1$ and $C_2$ monitored, the measurements of CAC and CCA associated with such channels received from all of the devices that developed such measurements are combined. The combined CAC measurement indicates if the radar system 114 is using any of the frequencies associated with the candidate channel $C_1$ or $C_2$. In one embodiment, the CCA measurements developed by devices that monitor beacon frames broadcast by access points in the network 100 are weighted higher than CCA measurements developed by devices that monitor only client-generated traffic. Weighting CCA measurements in this manner may result in a more accurate assessment of channel usage because access points typically generate more interfering traffic than clients.

Figure 3A:
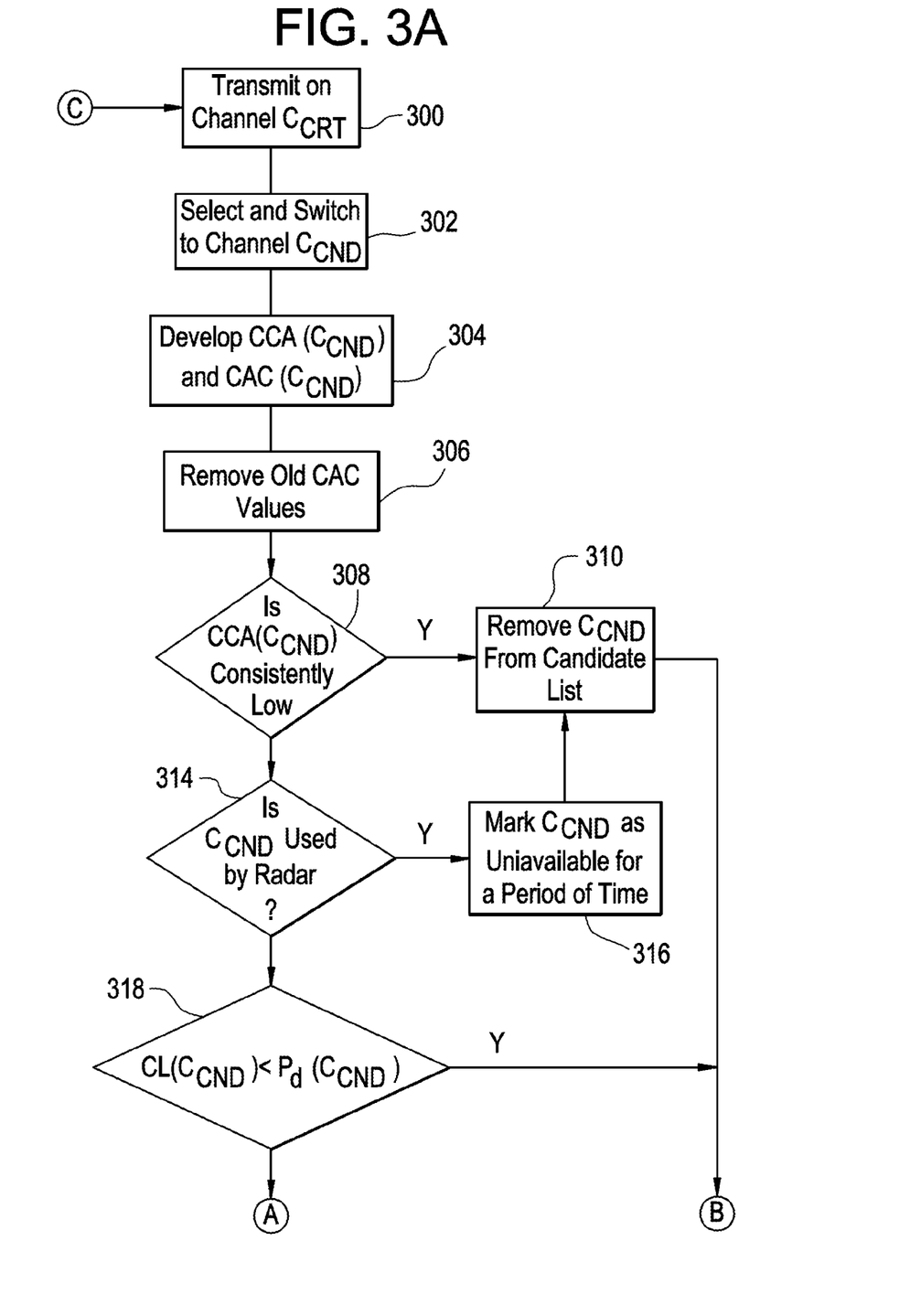
FIGS. 3A-3D and FIG. 4 are flowcharts of processing undertaken by the device operating in the network of FIG. 1.

FIG. 3A is a flowchart that shows the processing undertaken by an embodiment of a master node of the network 100. A block 300 transmits data on a channel associated with a value $C_{CRT}$ for a predetermined duration. Thereafter, during an idle period (described below) a block 302 selects a candidate channel associated with a value $C_{CND}$ to be monitored and switches to such channel. The block 302 also transmits control packets to other nodes in the network 100 to switch to the channel $C_{CND}$ and monitor such channel. The master node maintains a list of candidate channels from which candidate channels may be selected. The block 302 may select channels sequentially or randomly from this list. A block 304 directs any devices in the network that are capable, including the master node, to monitor the channel associated with the value $C_{CND}$. In addition, the block 304 receives CAC measurements from the devices that monitored the channel associated with the value $C_{CND}$ and combines such measurements to develop a combined CAC measurement CAC($C_{CND}$). Similarly, the block 304 also receives CCA measurements from all of the devices that monitored the channel associated with the value $C_{CND}$ and develops a combined CCA measurement CCA($C_{CND}$). In some embodiments, the combined CCA measurement CCA($C_{CND}$) is developed by calculating the average of the received CCA measurements. In other embodiments, the combined CCA measurement CCA($C_{CND}$) is developed by calculating a weighted average of the received CCA measurements. In such embodiments, a weighting factor applied to a CCA measurement received from a particular device may be correlated with an amount of traffic expected to be routed through such device. For example, a weighting factor applied to the CCA measurement from a device that is expected to have more traffic routed therethrough may be larger than a weighting factor applied to the CCA measurement from a device that is expected to have less traffic routed therethrough. Such traffic based weighting may favor those channels that have less interference in the proximity of a device with higher traffic. In some embodiments, regardless of whether a weighted or non-weighted average is used to calculate the combined CCA measurement CCA($C_{CND}$), each CCA measurement used to calculate the combined CCA measurement CCA($C_{CND}$) is normalized. In one embodiment, such CCA measurement is normalized using a lookup table calibrated for the device that developed the CCA value. Normalizing each such CCA measurement in this manner ensures that the CCA measurements sent by various devices are within an identical range of values regardless of the different hardware actually used by a device to develop such CCA measurement. Other ways of developing normalized CCA measurements may be used.

A block 306 removes any values of CCA associated with previously monitored channels that have expired. In particular, the CCA assessment for a particular channel is considered valid only for a particular length of time and any CCA value older that such length of time is discarded.

A block 308 determines if the value CCA($C_{CND}$) of the channel associated with the value $C_{CND}$ is consistently low and, if so, control passes to a block 310 to remove such channel from the list of candidate channels and then to a block 312 that switches communication to the channel associated with the value $C_{CRT}$. Otherwise, a block 314 determines if the value CCA($C_{CND}$) indicates that frequencies of the channel associated with the value $C_{CND}$ are being used by a radar system and, if so, control passes to a block 316 that marks the channel associated with the value $C_{CND}$ as unavailable for a predetermined period of time. Such predetermined period of time is typically specified by the standard or regulation (for example, the ETSI standard noted above) with which the network 100 complies. Control thereafter passes to the block 310.

If the block 314 determines that the frequencies of the channel associated with the value $C_{CND}$ are not being used by a radar system, a block 318 compares a value CL($C_{CND}$) with a $P_d(C_{CND})$. The value CL($C_{CND}$) is associated with a confidence level that the frequencies of the channel associated with the value $C_{CND}$ are not used by a radar system. As noted above, the value $P_d(C_{CND})$ is the value $P_d$ associated with the channel associated with the value $C_{CND}$ and is the minimum probability a device must attain that a radar system is not using frequencies associated with such channel before transmitting on the channel. If the block 318 determines that the confidence level value $CL(C_{CND})$ is less than the minimum probability value $P_d(C_{CND})$, control passes to the block 312.

Otherwise, a block 320 determines if a value QUALITY ($C_{CND}$) that represents the quality of the channel associated with the value $C_{CND}$ exceeds a value QUALITY($C_{BEST}$). The value $C_{BEST}$ is associated with a previously monitored channel that was found to have the best quality and the value QUALITY($C_{BEST}$) represents the measurement of quality of such channel. The values QUALITY($C_{CND}$) and QUALITY ($C_{BEST}$) may be developed using the values of CCA($C_{CND}$) and a combined CCA of the channel $C_{BEST}$, respectively. Other factors may be considered in developing a value that represents the quality of the channel including the RSSI of the channel. A bandwidth of a channel C may be determined from a value RSSI(C) that represents the RSSI associated with such channel and the CCA value associated with the channel C indicates the bandwidth of the channel C that is available for transmission. In one embodiment, a quality value QUALITY (C) of a particular channel C may be set to the value CCA(C) calculated by the block 304. Other ways of developing a quality assessment of a channel may be used and will be apparent to those having skill in the art.

If the block 320 determines that the value QUALITY($C_{CND}$) exceeds the value QUALITY($C_{BEST}$), a block 322 sets the value of $C_{BEST}$ to the value $C_{CND}$ and control passes to a block 324. Otherwise, control passes to the block 324. The block 324 determines whether the value QUALITY($C_{CRT}$) that represents the quality of the channel used for transmission at the block 300 exceeds the value QUALITY($C_{BEST}$) by a predetermined threshold value THR and, if so, control passes to the block 312. Otherwise control passes to a block 326. The predetermined threshold value THR used by the block 324 is selected to introduce hysteresis in the system and avoid constant switching between two channels that have similar quality measurements.

The block 326 sets the value $C_{CRT}$ to the value $C_{BEST}$ and thereafter the block 312 switches to the channel associated with the value $C_{CRT}$ and control returns to the block 300.

In some cases, if the network 100 comprises one or more client devices (i.e., devices other than access points), such client devices may disconnect from the network if the block 312 switches to a new channel associated with the value $C_{CRT}$ set by the block 326. Further, a significant amount time may be required by the client device to reconnect to the network 100 using the new channel.

Figure 3B:
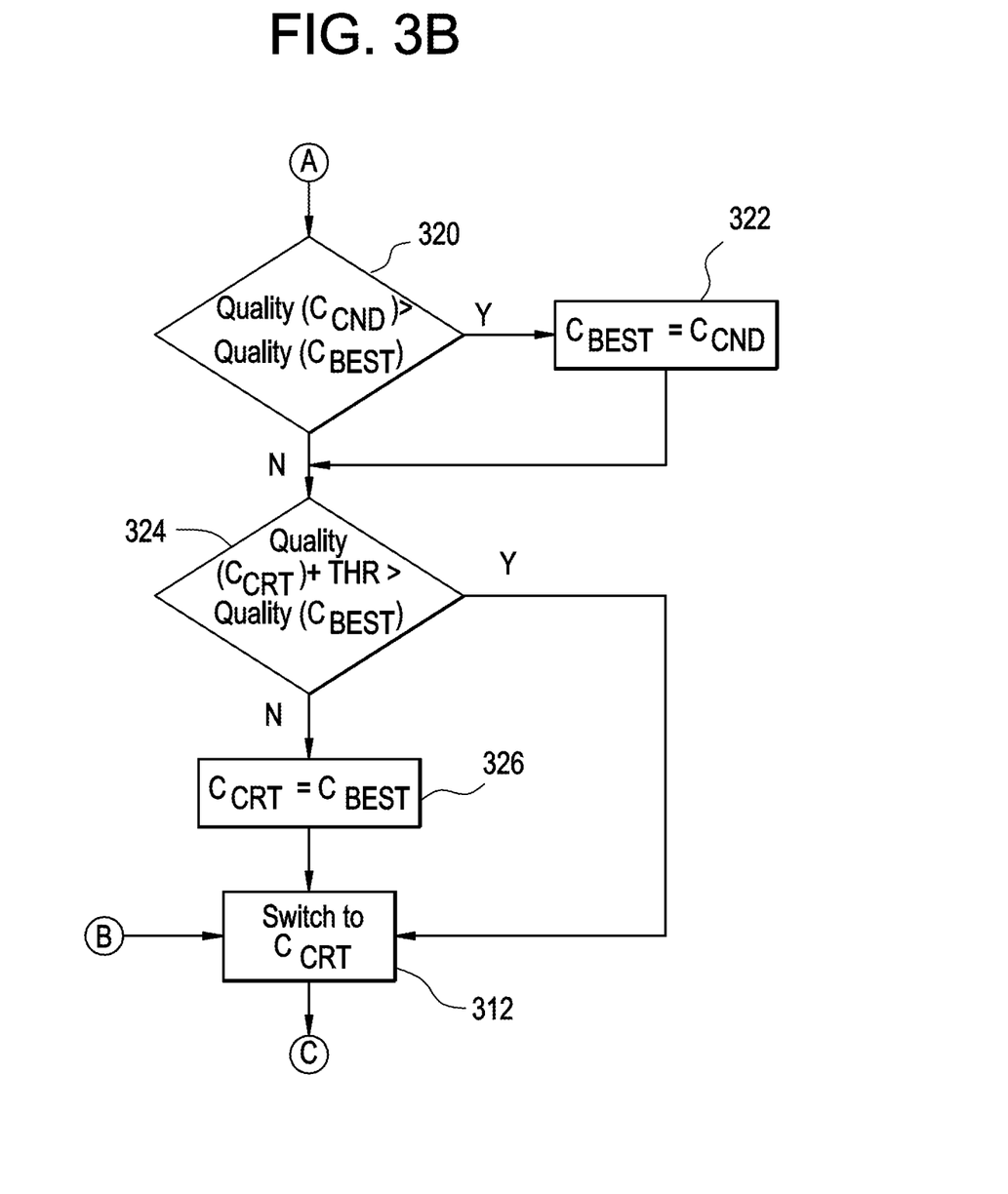
Figure 3C:
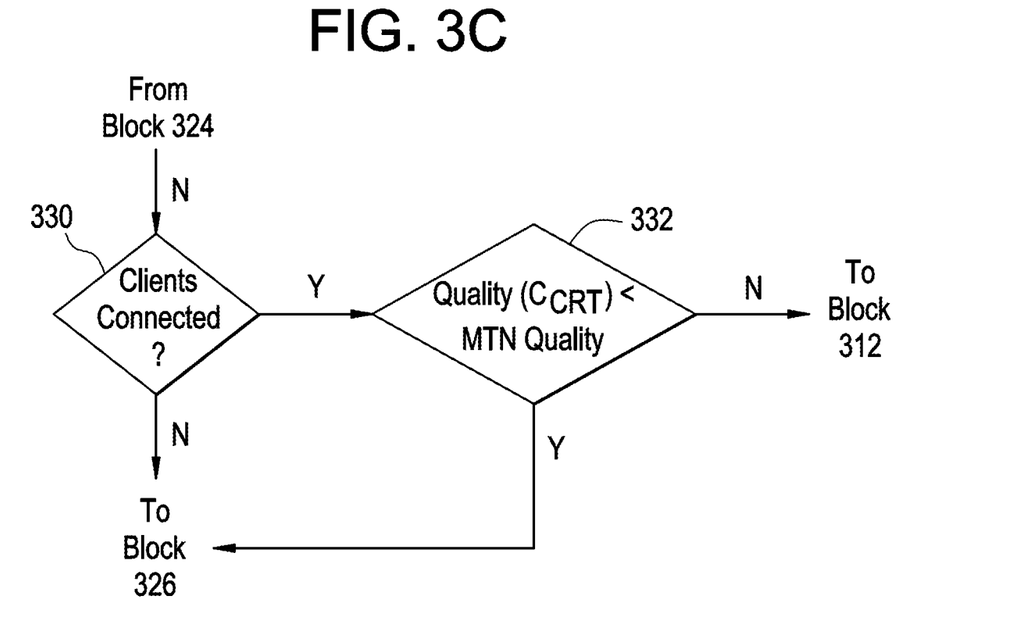

FIG. 3C shows a flowchart of additional processing that may be undertaken to prevent switching from a current channel to another channel for transmission unless the quality of the current channel is less than a minimum quality threshold. After the block 324 of FIG. 3A determines that the quality of the current channel $C_{CRT}$ is not sufficiently better than the quality of the channel $C_{BEST}$ and that switching communication to $C_{BEST}$ may be warranted, a block 330 determines if any client devices are connected to the network 100. If no client devices are connected to the network 100 then control proceeds to the block 326 of FIG. 3A. Otherwise, a block 332 determines if the quality of the channel $C_{CRT}$ represented by the value QUALITY($C_{CRT}$) is less than a predetermined minimum quality level and, if so, control passes to the block 326. In some embodiments, the minimum quality level is set in accordance with the bandwidth requirements of the typical system. For example, if a video bridge unit requires at least 60 Mbps of bandwidth, then a minimum quality level that provides at least 60 Mbps plus an additional 20 Mbps of headroom for momentary peaks and other network communications may be required for control to pass from the block 332 to the block 326. In this example, if the RSSI of the network link at the video bridge indicates a total bandwidth at such link to be 100 Mbps, then a CCA value of 0.8 indicates that a bandwidth of 80 Mbps is available. Therefore, the comparison at the block 332 would determine if the value of QUALITY($C_{CRT}$) is less than 0.8 and, if so, control would pass to the block 326. Otherwise, control would pass to the block 312.

Figure 3D:
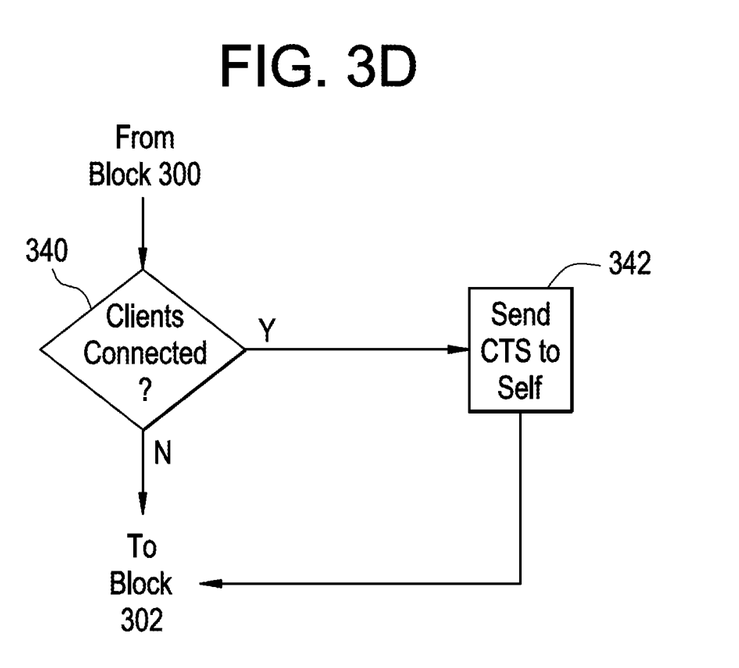

Although, the amount of time required by the block 302 through 326 is sufficiently short that the client device operating in the network 100 may not disconnect. However, in some embodiments, the master node may reserve the channel associated with the value $C_{CRT}$ before switching to the candidate channel to monitor such channel. FIG. 3D is a flowchart of additional processing the master node may optionally undertake in addition to that shown in FIGS. 3A and 3B. After the block 300, a block 340 checks if any client devices are connected to the network 100. If there are no client devices connected then processing proceeds to the block 302. Otherwise, a block 342 sends a "CTS-to-Self" message that reserves the channel associated with the value $C_{CRT}$ for the duration of time expected to be needed by the blocks 302 through 326. After the block 342, control passes to the block 302. In those embodiments in which the master node does not transmit the CTS-to-Self message, a client device may transmit packets on the channel associated with the value $C_{CRT}$, however, such packets may be lost and be retransmitted as would apparent to one of skill in the art.

Figure 4:
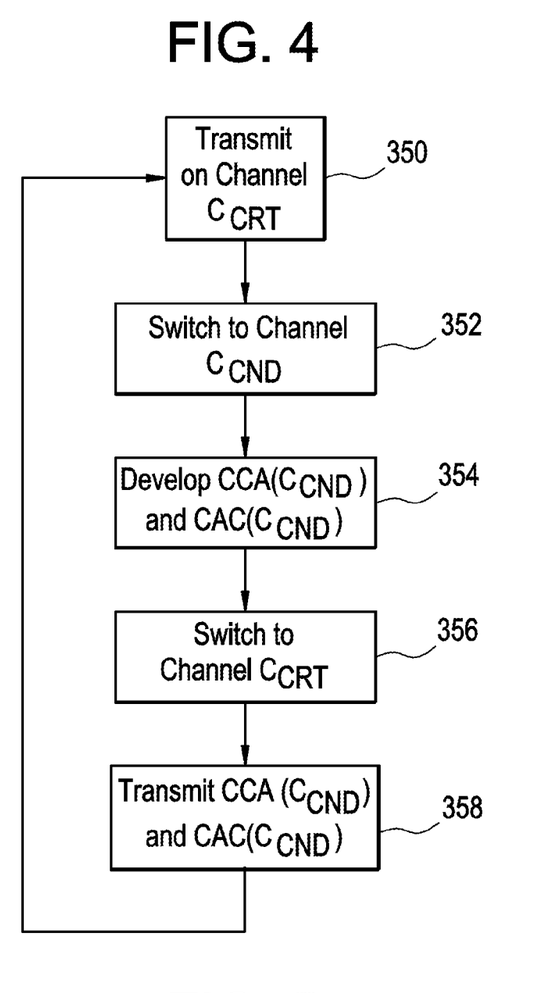

FIG. 4 is a flowchart that shows the processing undertaken by an embodiment of a device operating in the network 100 that is not the master node. A block 350 uses the channel associated with the value $C_{CRT}$ to transmit data. A block 352 receives a control packet transmitted by the master node (for example, by the block 302 described above) to switch to a candidate channel associated with a value $C_{CND}$. A block 354 develops the values CCA($C_{CND}$) and CAC($C_{CND}$). A block 356 switches to the original channel $C_{CRT}$, and a block 358 transmits the values CCA($C_{CND}$) and CAC($C_{CND}$) developed by the block 354 to the master node.

In some embodiments, if all the channels that are available as specified by the communication protocol being used can be evaluated within the length of time that the CCA values are valid, then the list of channels from which the block 302 selects candidate channels includes all of these channels. Otherwise, a randomly selected initial subset of the channels that are available comprise such list, wherein the number of channels that are selected is the quantity of channels that can be evaluated in the length of time that the CCA values are valid. The number channels that comprise the list may also depend on the minimum confidence level for the CAC measurement, the amount of time spent monitoring a channel, the accuracy of with which the CAC measurement hardware operates, and the like.

Figure 5:
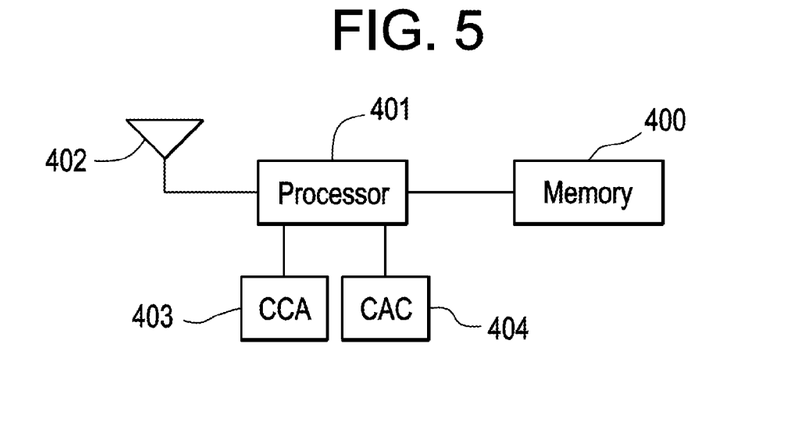
FIG. 5 is a block diagram of the components of the device operating in the network of FIG. 1.

FIG. 5 is a block diagram of an embodiment of a device 104, 106, 108, or 110 that may be capable to assess the quality of channel. The device 104, 106, 108, or 110 includes a memory 400 and a processor 401. The device 104, 106, 108, or 110 also includes a radio apparatus 402 controlled by the processor 401. The memory 400 comprises code executable by the processor 401 to undertake, for example, the processing shown in FIG. 3. In addition, the values by used by the processing shown in FIG. 3 may also be stored in the memory 400. The device 104, 106, 108, or 110 also includes a CCA module 403 and a CAC module 404. The CCA and CAC modules assess radio signal measurements obtained by the radio apparatus 402. In a preferred embodiment, the device 104, 106, 108, or 110 comprises a programmable element, discrete components, firmware, or a combination thereof and the functions undertaken by the processor 401 may be implemented by programming and/or by hardware and/or firmware as desired. In some embodiments, the processor 401 and memory for instructions executed by such processor to operate the device 104, 106, 108, or 110 may be provided by an individual component such as an application-specific integrated circuit, a field-programmable gate array, and the like.

Figure 6:
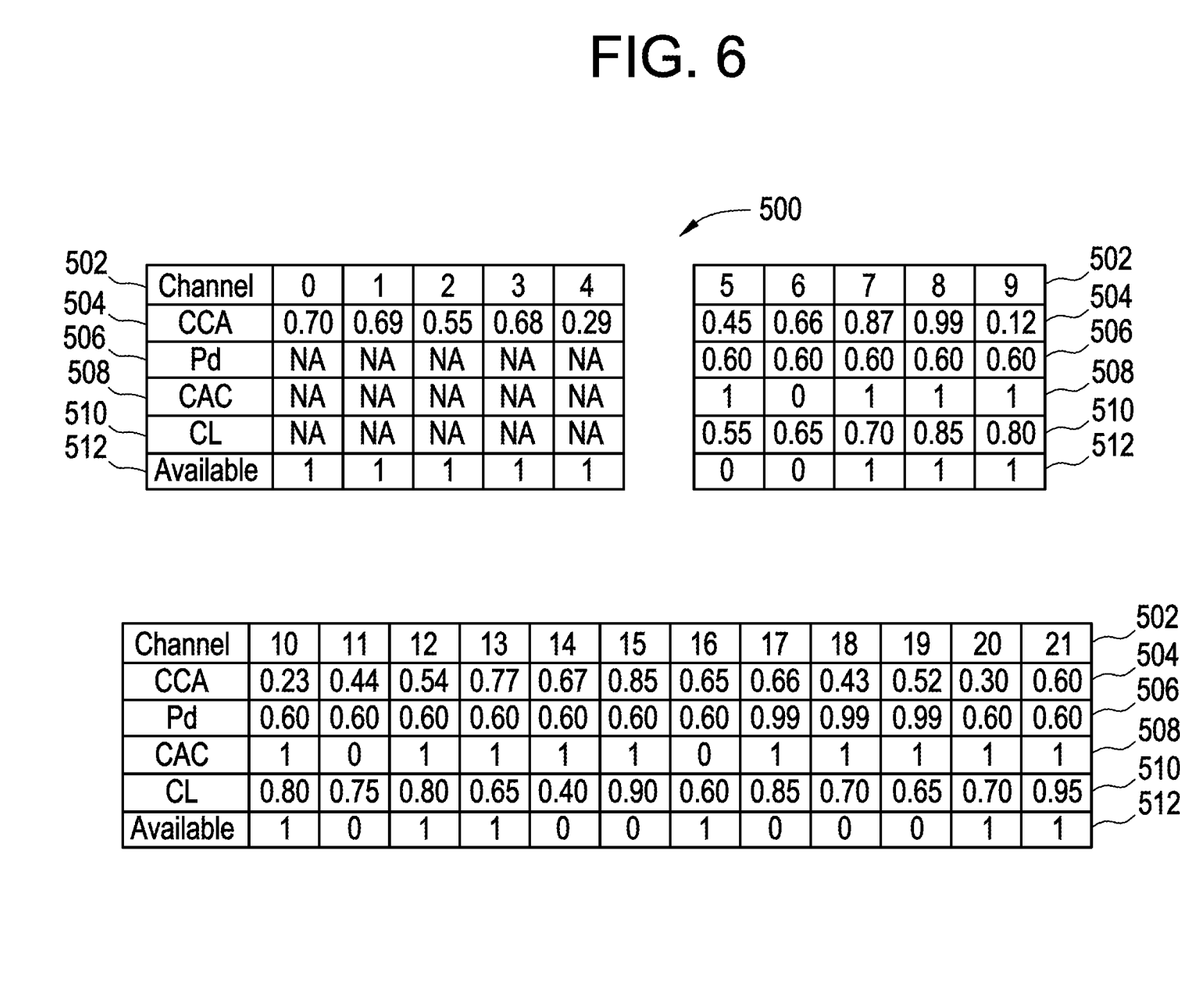
FIG. 6 is an exemplary channel assessment table developed and used the device operating in the network of FIG. 1.

FIG. 6 shows a channel assessment table that may be developed, stored in the memory 400, and used during the processing shown in FIG. 3. In particular, a row 502 indicates the identifiers associated with 22 channels available in accordance in a network operating in accordance with the IEEE 802.11n 5 GHz protocol, wherein each channel occupies a 20 MHz frequency band. A row 504 shows the most recent CCA measurement for each channel. A row 506 shows a probability value $P_d$ associated with the channel that indicates the confidence level a master node must have that a radar system is not using any frequencies associated with such channel before using the channel for transmission. In one embodiment, the CAC of a 40 MHz channel may be used to assess the availability of two adjacent 20 MHz channels comprising the 40 MHz channel.

A row 508 shows the most recent CAC estimate for each channel and a row 510 indicates a confidence level associated with such CAC estimate. The row 512 indicates whether a channel can be considered a candidate for transmission, wherein an entry in row 512 associated with the channel that has a value "1" indicates that such channel may be considered. In particular, if the CAC value in the row 508 associated with a channel has a value "1" and if the confidence level for a particular channel is greater than the value $P_d$ associated with such channel, then such channel is considered a candidate for transmission and the entry in row 512 associated with the channel is given the value "1."

Figure 7:
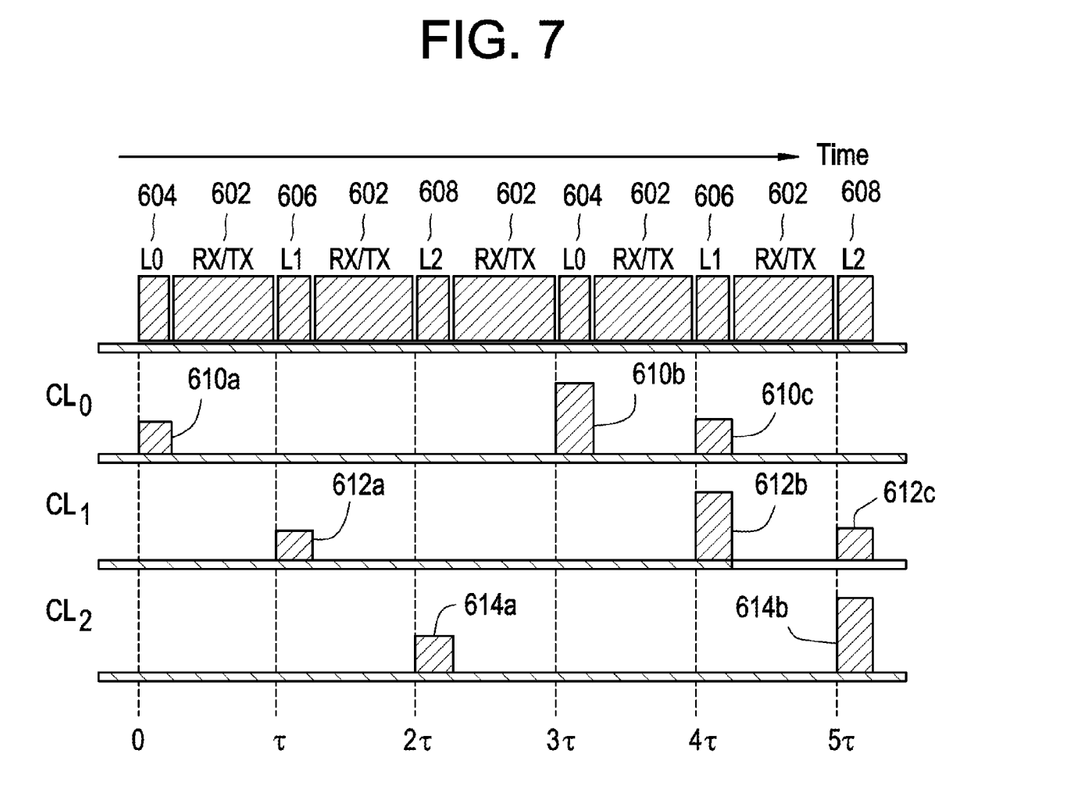
FIG. 7 is a timing and confidence level diagram illustrating the operation of the device operating in the network of FIG. 1.

FIG. 7 shows a timing diagram and confidence level graph that illustrates changes in the confidence level that a radar system is using frequencies in a particular channel. In particular, the time periods 602 are periods of time during which a device 104, 106, 108, or 110 receives or transmits data on a selected channel. The time periods 604, 606, and 608 are periods when a first, a second, and a third channel are monitored as described above. In the timing diagram of FIG. 7, the length of time that a CCA estimate is valid is 4τ. The bars 610a, 610b, and 610c indicate the confidence level that there is no radar activity in first channel. The height of each bar is in accordance with the confidence level associated therewith. The confidence level associated with the bar 610 is based only on the CCA estimates that were developed in preceding length of time 4τ and, therefore, do not include the CCA estimate that was included in the confidence level indicated by the bar 610A. The bars 612a, 612b, and 612c indicate confidence levels associated with the second channel and the bars 614a and 614b indicate confidence levels associated with the third channel.

Figure 8:
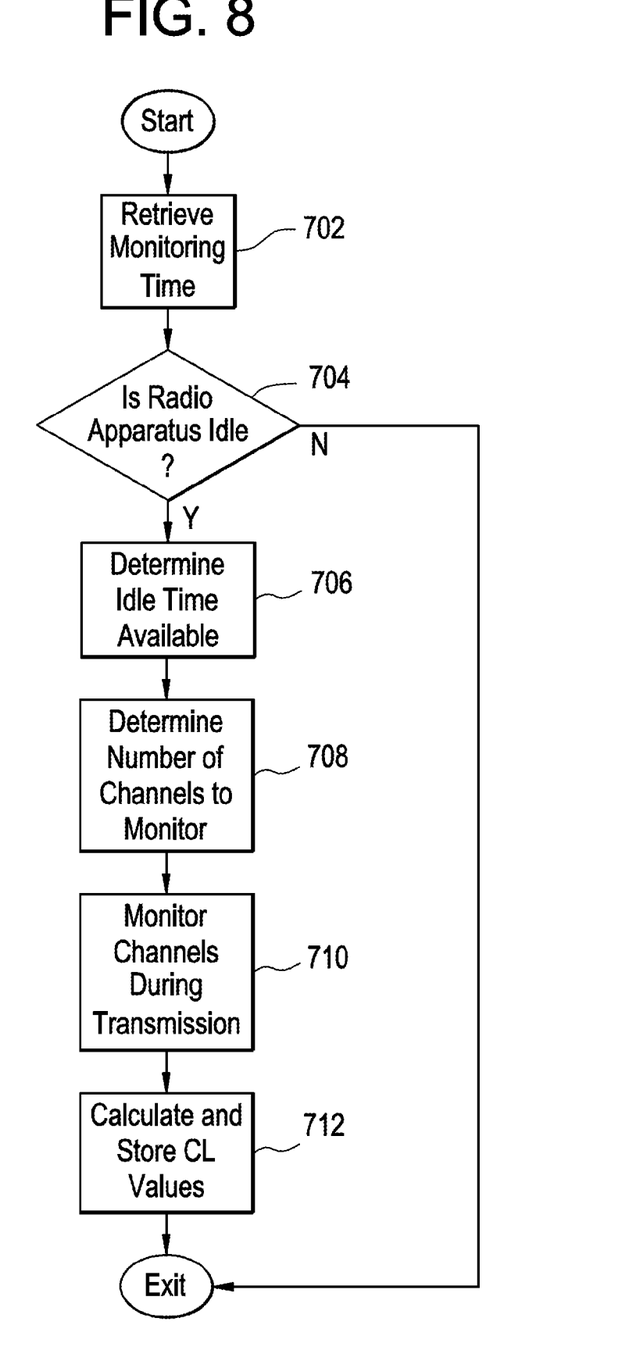
FIG. 8 is another flowchart of processing undertaken by the device operating in the network of FIG. 1.

FIG. 8 is a flowchart of processing the processor 401 may undertake to monitor channels. A block 702 retrieves a predetermined value that represents the amount of time necessary to tune and monitor a channel. The type of CCA and CAC modules 403 and 404 being used determines this predetermined value.

A block 704 determines if the radio apparatus 402 is available and, if it is, proceeds to a block 704. If the radio apparatus 402 is not available, processing completes. The block 704, running on the master node, determines the amount of idle time that is available. The idle time is based on an estimate of the loading of the system. For example, if the network is operating at 90% of its capacity, then 10% idle time is available. Such idle time is the time that is available to monitor other channels as described herein. In some embodiments, the idle time of the network 100 may be calculated as follows:

$$\text{idle time} = 1 - \Sigma_{all\ links}(\text{desired link throughput/total link bandwidth})$$

The idle time is calculated over all links between the nodes in the network. For example, assume a network as three nodes A, B, and C. Further, assume that the total channel bandwidth of the link between nodes A and B is 100 Mbps, between nodes A and C is 150 Mbps, and between nodes B and C is 50 Mbps. Further, assume that the desired channel throughput between nodes A and B is 30 Mbps, between nodes A and C is 30 Mbps, and between nodes B and C is 5 Mbps. Therefore, the ratio of the desired channel throughput to total channel bandwidth of the link between nodes A and B is 0.3, between nodes A and C is 0.2, and between nodes B and C is 0.1. For this example, the idle time for the network according to equation (2) is 40%. That is up to 400 milliseconds of each second may be used to monitor other channels.

A block 708 determines the number of channels that may be monitored during the idle time determined by the block 704. The block 708 also selects the channels to monitor as described above.

The block 710 monitors channels during transmission as described above, for example, in connection with FIG. 2. A block 712 calculates and stores in the memory 100 the confidence levels associated with the channels monitored by the block 710.

In a network in which the individual nodes of the mesh network monitor a particular channel C, the value CL(C) developed from the CAC measurements of such channel is adjusted based on the number of nodes undertaking such monitoring. That is, the more nodes that develop a value CAC(C) for the channel C, the higher the value CL(C) of the confidence level. The value QUALITY(C) that represents the quality estimate of the channel C is developed from quality estimates developed by the individual nodes. In some embodiments, the value QUALITY(C) is an average of the quality estimates developed by each of the individual nodes. Typically, the master node in the network receives estimates of CCA and channel quality from the individual nodes and develops the CL(C) and QUALITY(C) values for the network from such estimates. In one embodiment of the invention, CAC(C) is calculated via a weighted average of the individual CAC readings taken by each node. Such an embodiment may generate fewer false positive and more false negatives detections of radar activity. A false positive detection is a detection of radar activity when there is none. A false negative detection is a failure to detect active when it is present. In another embodiment, the worst case CAC reported by individual nodes is used to establish a value CAC(C) associated with a channel C. Such embodiment may generate fewer false negatives detections and more false positive detections of radar activity.

In networks in which each individual node of the mesh network monitors different channels, the value CL(C) for the CAC of each channel C is adjusted based on measurements from individual nodes. The value CCA(C) reported by each is node used without modification. It should be apparent that having all nodes monitor the same channel usually provides more reliable results. However, having individual nodes monitor different channels may be warranted if the network loading allows only a short time for channel sniffing, or if the CAC and CCA measurement modules on the devices are sensitive enough for individual measurements to be sufficiently accurate.

Using idle time that is available in a network to monitor candidate channels allows off-channel CAC measurements to be developed without interrupting transmission of a service such as video streaming. In a network that is loaded to capacity, very little time may be used for monitoring and so fewer candidate channels may be monitored. However, in a network that is even moderately loaded, sufficient idle time may be available for monitoring many candidate channels.

In some embodiments, the access points and gateway operating in a network may simultaneously monitor the same channel, under coordination of the master node. In other embodiments, the gateway and access points may be assigned different channels to monitor during a particular time period, thereby allowing more channels to be monitored.

Referring once again to FIG. 5, the memory 400 of a device operating in the network 100 may also have stored therein computer-executable instructions to reduce transmission delay jitter. In particular, such computer-executable instructions, when executed by the processor 401, cause a plurality of packets received by the radio apparatus 402 in a first order to be stored in a packet buffer memory in such order and cause a pointer associated with each one of the plurality of packets to be stored in the pointer buffer memory. The packet buffer memory and the pointer buffer memory may be portions of the memory 400 and/or additional memory components (not shown). Execution by the processor 401 of the computer-executable instructions may also cause the pointers stored in the pointer buffer memory to be placed in a second order sorted in accordance with a timestamp that is included with each packet and cause the packets stored in the packet buffer memory to be transmitted either using the radio apparatus 402 or via an Ethernet port (not shown) in accordance with the sorted pointer to each packet.

Computer-executable instructions may be stored in the memory 400 of the device operating in the network 100 to automate configuration of the device. Such computer-executable instructions, when executed, cause the processor 402 of such device to examine WPS information in a management packet received by the radio apparatus 402 and determine whether there is an information field specific to a manufacturer in such management packet. If there is an information field specific to a manufacturer, execution of the computer-executable instructions cause the processor 402 to determine whether a manufacturer code in the information field matches a manufacturer code associated with the device and, if so, determine whether a wireless network identification code in the management packet matches a wireless network identification code associated with the device. If such wireless network identification codes do match, the computer-executable instructions cause the processor 402 to determine if a configuration change serial number in the management packet is greater than a configuration number in a memory (either the memory 400 or another memory, not shown) of the device. If the configuration serial number in the management packet is greater than the configuration number in the memory of the device, the computer-executable instructions cause the processor 402 to determine that there is a configuration change and receive a new configuration with a trusted PIN.

A list of exemplary and independent reasons supporting the patentability of the invention disclosed and claimed herein includes, at least, that:

(a) the system and method disclosed herein eliminates downtime (typically one minute) when switching channels in 5 GHz wireless frequencies used by radar system. Yet the system and method remain compliant with regulations related to avoiding radar interference. Other devices usually wait one minute when first switched on to start on a non-radar-exempt channel, but can only switch to radar-exempt-channels (which are typically crowded) during runtime.

(b) the system and method disclosed herein guarantee, for low to moderate network loading in which all channels may be monitored, that the highest wireless bandwidth is made available to the mesh network by selecting the best channel.

(c) the system and method disclosed herein dramatically improves available bandwidth for high network loading in which some but not all channels may be monitored. The improved available bandwidth approaches the performance bound attain in low network loading scenarios by gradually sifting out low-capacity channels from the candidate list (thus focusing on the highest capacity ones).

(d) the system and method disclosed herein only require a single RF chip (antenna array), which helps control the cost of a regular consumer device. Other devices may add hardware dedicated to monitoring channels and thus increase the costs of such devices.

An exemplary wireless network device comprises an input port adapted to receive Internet signals, a single RF module adapted to supply wireless signals to a network, a memory, and processor. The memory has computer-executable instructions stored therein. Execution of the computer-executable instructions by the processor causes the processor to retrieve a channel monitoring time from the memory, determine if the single RF module is idle, and determine a period of time the single RF module is idle. Further, execution of the computer-executable instructions causes the processor to determine a quantity of 5 GHz channels that may be monitored in the period of time and randomly select channels to monitor, wherein the quantity of selected channels does not exceed the quantity of 5 GHz channels that may be monitored. In addition, execution of the computer-executable instructions causes the processor to monitor the selected channels and develop a value of a confidence level for each channel. Each channel is monitored for a predetermined period of time between transmissions of data and the confidence level associated with a channel indicates the probability that frequencies associated with such channel are used by a radar system. Execution of the computer-executable instructions causes the processor to store the developed values of confidence levels in the memory.

In one embodiment, the exemplary wireless network device is an access point. In another embodiment, the exemplary wireless network device is one of a gateway, mobile device, laptop, or tablet computer.

In still another embodiment, the exemplary the wireless network device operates in a wireless network. The wireless network may include a further wireless network device operating therein. In such cases, the processor of the exemplary wireless network device and a processor of the further wireless network device simultaneously monitor an identical channel. Alternately, the processor of the exemplary wireless device and a processor of the further wireless device simultaneously monitor a first and a second channel, wherein the first and the second channel are different. In addition, the processor of the further wireless network device monitors a channel and transmits a result of the monitoring to the exemplary wireless network device.

In further embodiments, the exemplary wireless network device is adapted to operate in an IEEE 802.11 compliant network.

In some embodiments, a single integrated circuit provides at least a portion of the processor and the memory. Further, in some cases, such single integrated circuit is an application specific integrated circuit. In other cases, such integrated circuit is a field programmable gate array.

Other embodiments of the disclosure including all the possible different and various combinations of the individual features of each of the foregoing described embodiments are specifically included herein.

INDUSTRIAL APPLICABILITY

The system and method described herein may be utilized to select channels that may be used for wireless communication in a network. Further, numerous modifications to the present disclosure to enhance the efficacy of selecting channels that may encounter less interference from other device operating in proximity to the network will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the appended claims are reserved.

We claim:

1. A wireless network device comprising:
   an input port configured to receive signals;
   a wireless module configured to supply wireless signals to a network;
   a memory, wherein the memory has computer executable instructions stored therein; and
   a processor, wherein execution of the computer executable instructions by the processor causes the processor to:
   retrieve a channel monitoring time from the memory,
   determine if the wireless module is idle,
   determine a period of time the wireless module is idle,
   determine a quantity of channels within a frequency band used by a radar system that may be monitored in the period of time,
   randomly select channels to monitor, wherein the quantity of selected channels does not exceed the quantity of channels within the frequency band used by the radar system that may be monitored,
   monitor the selected channels during the period of time the wireless module is idle, wherein each channel is monitored for a predetermined period of time between transmissions of data,
   develop a value of a confidence level for each channel, wherein the confidence level associated with a channel indicates the probability that frequencies associated with such channel are used by the radar system,
   store the developed values of confidence levels in the memory, and
   update the developed value of confidence level for each channel during each period of time the wireless module is idle, wherein
   the execution of the computer executable instructions causes the processor to determine the period of time by,
   determining, for each available wireless link, a ratio of a throughput of each available wireless link to a corresponding available bandwidth;
   determining a sum of the ratios; and
   determining the period of time the wireless module is idle as a difference between a constant number and the determined sum.

2. The wireless network device of claim 1, wherein the wireless network device is an access point.

3. The wireless network device of claim 1, wherein the wireless network device is a gateway.

4. The wireless network device of claim 1, wherein the wireless network device operates in a wireless network.

5. The wireless network device of claim 4, wherein the wireless network includes a further wireless network device operating therein.

6. The wireless network device of claim 5, wherein the processor of the wireless network device and a processor of the further wireless network device are configured to simultaneously monitor an identical channel.

7. The wireless network device of claim 5, wherein the processor of the wireless network device and a processor of the further wireless network device are configured to simultaneously monitor a first and a second channel, wherein the first and the second channels are different.

8. The wireless network device of claim 5, wherein a processor of the further wireless network device is configured to,
   monitor a channel, and
   transmit a result of the monitoring to the wireless network device.

9. The wireless network device of claim 1, wherein the wireless network device is configured to operate in an 802.11x compliant network.

10. The wireless network device of claim 1, wherein the wireless module is a wireless radio frequency (RF) module.

11. The wireless network device of claim 1, wherein the processor is configured to determine the period of time the wireless module is idle according to the following formula:

$$\text{Idle time} = 1 - \Sigma_{available\ wireless\ links}(A/B)$$

wherein for each of the available wireless links, A is the throughput and B is the corresponding available bandwidth.

12. The wireless network device of claim 1, wherein the frequency band is a 5 Gigahertz (GHz) band used by the radar system.

13. The wireless network device of claim 1, wherein the signals are wireless signals.

14. The wireless network device of claim 13, wherein the wireless signals are radio frequency signals.

* * * * *